United States Patent
Klaas et al.

(10) Patent No.: US 11,624,414 B2
(45) Date of Patent: Apr. 11, 2023

(54) DISC BRAKE WITH A TENSIONING DEVICE ARRANGED THEREIN AND SUPPORTING ROLLER FOR THE TENSIONING DEVICE

(71) Applicant: BPW Bergische Achsen KG, Wiehl (DE)

(72) Inventors: Thomas Klaas, Reichshof (DE); Michael Pehle, Nümbrecht (DE)

(73) Assignee: BPW Bergische Achsen KG, Wiehl (DE)

( * ) Notice: Subject to any disclaimer, the term of this patent is extended or adjusted under 35 U.S.C. 154(b) by 323 days.

(21) Appl. No.: 16/632,135

(22) PCT Filed: Jul. 5, 2018

(86) PCT No.: PCT/DE2018/100618
§ 371 (c)(1),
(2) Date: Jan. 17, 2020

(87) PCT Pub. No.: WO2019/015716
PCT Pub. Date: Jan. 24, 2019

(65) Prior Publication Data
US 2020/0232527 A1     Jul. 23, 2020

(30) Foreign Application Priority Data
Jul. 18, 2017   (DE) .................... 10 2017 116 112.0

(51) Int. Cl.
*F16D 55/06*      (2006.01)
*F16D 55/2255*    (2006.01)
(Continued)

(52) U.S. Cl.
CPC .......... *F16D 55/2255* (2013.01); *B60T 1/065* (2013.01); *F16D 65/183* (2013.01); *F16D 2121/08* (2013.01); *F16D 2125/32* (2013.01)

(58) Field of Classification Search
CPC ............. F16D 2125/26; F16D 2125/28; F16D 2125/32; F16D 65/183; F16D 55/2255; B60T 1/065
See application file for complete search history.

(56) References Cited

U.S. PATENT DOCUMENTS 5,833,035 A    11/1998   Severinsson
5,927,445 A    7/1999    Bieker et al.
(Continued)

FOREIGN PATENT DOCUMENTS

CN     102 242 786     11/2011
DE     195 15 063      9/2001
(Continued)

*Primary Examiner* — Nicholas J Lane
(74) *Attorney, Agent, or Firm* — Gudrun E. Huckett

(57) ABSTRACT

The invention proposes a disc brake having a brake caliper (1) and a tensioning device arranged therein for applying force to the brake linings of the disc brake, wherein part of the tensioning device is a brake lever (10) which can be actuated by a force element and preferably by a compressed air cylinder. The brake lever is composed of a lever arm (14), against which the force element is supported, and a brake application shaft (15), which is supported against a pressure piece (8) acting towards the brake linings, and is also supported from the inside against the brake caliper, wherein the brake caliper (1) and the brake application shaft (15) face each other and are formed as shells (21, 22) in which a supporting roller (20) with a roller axis (A) running transverse to the tensioning direction (Z) is mounted. To keep the mutual movability of the parts involved low by the simplest measures possible and without the need for additional parts, the supporting roller (20) is supported with the lateral surface (20A) thereof directly in one of the two shells (21, 22) and is designed to be non-rotatable or have only limited rotational movement with respect to this shell. The supporting roller (20) also serves as a means to centre the brake (Continued)

lever (10) laterally in the brake caliper. A supporting roller particularly suited to these purposes is also to be created.

20 Claims, 5 Drawing Sheets

(51) Int. Cl.
*B60T 1/06* (2006.01)
*F16D 65/18* (2006.01)
*F16D 121/08* (2012.01)
*F16D 125/32* (2012.01)

(56) References Cited

U.S. PATENT DOCUMENTS

| | | | |
|---|---|---|---|
| 7,506,732 B2* | 3/2009 | Antony | F16D 65/183 |
| | | | 188/72.9 |
| 10,718,394 B2* | 7/2020 | Adamczyk | F16D 65/18 |
| 2003/0085082 A1 | 5/2003 | Severinsson et al. | |
| 2004/0050635 A1* | 3/2004 | Bieker | F16D 65/183 |
| | | | 188/381 |
| 2017/0191538 A1 | 7/2017 | Adamczyk et al. | |
| 2017/0234388 A1* | 8/2017 | Adamczyk | F16D 65/18 |
| | | | 188/72.9 |
| 2018/0106307 A1* | 4/2018 | Jungmann | B60T 13/12 |
| 2021/0079964 A1* | 3/2021 | Scherer | F16D 55/2255 |

FOREIGN PATENT DOCUMENTS

| | | |
|---|---|---|
| DE | 101 39 913 | 9/2002 |
| DE | 10 2009 023 416 | 12/2010 |
| DE | 10 2012 006 089 | 9/2013 |
| EP | 1944522 | 7/2008 |
| KR | 20130135203 | 12/2013 |
| WO | 2015/193157 | 12/2015 |
| WO | 2016/206778 | 12/2016 |

\* cited by examiner

DISC BRAKE WITH A TENSIONING DEVICE ARRANGED THEREIN AND SUPPORTING ROLLER FOR THE TENSIONING DEVICE

BACKGROUND OF THE INVENTION

The invention relates to a disk brake having a brake caliper and a brake application device arranged therein for acting with force on the brake linings of the disk brake, wherein a component of the brake application device is a brake lever which can be actuated by a force member and preferably a compressed air cylinder and which is composed of a lever arm, against which the force member is supported, and a brake application shaft which is supported, on the one hand, against a pressure piece which operates in the direction toward the brake linings and, on the other hand, from the inner side against the brake caliper by the brake caliper and the brake application device being constructed so as to face each other as shells; in which a support roller having a roller axis which extends transversely relative to the brake application direction is supported.

The invention further relates to a support roller for the brake application device of a disk brake.

Disk brakes are generally provided with a brake application device inside the brake caliper thereof. This device transmits and amplifies where applicable the force with which the brake linings which are arranged at both sides of the brake disk are moved into contact with the brake disk in order thereby to obtain the brake action as a result of friction.

In disk brakes of the generic type which are often actuated by compressed air, a brake lever which is arranged pivotably in the brake caliper is a component of the brake application device. The brake lever comprises a lever arm and a brake application shaft which is configured as an eccentric in cross-section. The force member of the disk brake is supported on the lever arm, for example, the compressed air cylinder in the case of a disk brake which is actuated by compressed air. The brake application shaft of the brake lever is supported, on the one hand, against a pressure piece which operates in the direction toward the brake lining at the vehicle inner side and, on the other hand, against the rear side of the brake caliper housing.

DE 195 15 063 C2 and DE 10 2012 006 089 A1 disclose disk brakes which have the above-mentioned features and in which, in order to support the brake lever toward the rear, that is to say, at the brake caliper side, there are constructed as shells an inner face of the brake caliper, on the one hand, and the brake application shaft of the brake lever, on the other hand, in a state facing each other. A support roller is supported in the shells with a roller axis which extends transversely relative to the brake application direction. In the construction type according to DE 195 15 063 C2, the support roller is in one piece while, in the construction type according to DE 10 2012 006 089 A1, two separate support rollers are used because the brake application shaft of the brake lever is also divided in two, with a first longitudinal portion and a second longitudinal portion, between which a free space for receiving a re-adjustment device is located. In order to center the support rollers in the direction of the roller axis thereof with respect to the brake lever, an additional shaped sheet metal component of complex configuration is fixed to the brake lever. Lugs on the shaped sheet metal component prevent the support rollers from being displaced along the axis thereof relative to the brake lever.

An object of the invention is to keep the mutual movability of the components involved small in a disk brake having a brake application device which is arranged in the brake caliper thereof and which has inter alia a pivotable brake lever, by steps which are as simple as possible and without any need for additional components. Furthermore, a support roller which is particularly suitable for these purposes is intended to be provided.

SUMMARY OF THE INVENTION

In order to achieve this object, there are proposed a disk brake of a first configuration and a second configuration as characterized below and a support roller for the brake application device of a disk brake as characterized below.

The disk brake is characterized in a first configuration in that the support roller with the covering face thereof is supported directly in one of the two shells and is constructed to be rotationally secure or rotationally movable to a limited extent in relation to this shell.

The disk brake is characterized in a second configuration in that the support roller, for its orientation in an axial direction, abuts with a first face axially against the brake caliper and with a second face axially against the brake application shaft of the brake lever, wherein the second face is orientated counter to the first face.

A support roller according to the invention for the brake application device of a disk brake is characterized by a covering face which is constructed for supporting the support roller between two shells and a collar which is arranged at one end of the covering face and which extends radially beyond the covering face, wherein the support roller has an asymmetry with respect to the roller axis thereof and the asymmetry involves a recess or flattened portion which extends parallel with the roller axis on the otherwise cylindrical covering face.

Thereby, in a disk brake having a brake application device which has a pivotable lever, it is possible for the mutual movability of the components involved, particularly the mutual movability transversely relative to the brake application device, to be able to be kept small using simple means and without any need for additional components.

Different configurations of the disk brake according to the invention and the support roller according to the invention are set out in the dependent claims.

According to an embodiment of the disk brake, the support roller is configured in relation to the shell which is constructed on the brake application shaft not to be rotationally movable or at most rotationally movable to a limited extent. This is preferably achieved in that the support roller has an asymmetry in relation to the roller axis in order to achieve the rotationally secure property or the rotational limitation. Preferably, the asymmetry involves a recess which extends parallel with the roller axis on the otherwise cylindrical covering face of the support roller.

According to an embodiment, the shell which is constructed directly on the brake application shaft of the brake lever is composed of two segments which are bent in a pitch-circle-like manner and which have the same radius and a flattened portion which is arranged between the segments and which extends parallel with the roller axis, wherein the flattened portion projects radially inwardly with respect to the radius of the segments. For example, the flattened portion may be configured as a flat channel which forms the base of the shell.

It is further proposed that the width of the flattened portion be smaller than the width of the recess on the covering face of the support roller, preferably from 10% to 30% smaller.

In the second embodiment of the disk brake according to the invention, the support roller abuts axially against the brake caliper with a first face for the orientation thereof in an axial direction and, with a second face, axially against the brake application shaft of the brake lever. The second face is orientated counter to the first face and preferably the second face is offset in an axial direction relative to the first face.

The support rollers which are preferably present as a support roller pair are therefore not only support means in transmitting the brake application forces, but they are further lateral orientation means which orientate the brake lever transversely relative to the brake application direction and thus center it laterally in the brake caliper housing.

For the mutual orientation of the components involved, it is further proposed that the first face be an end face of the support roller and abut against an orientation face which is arranged internally on the brake caliper.

It is proposed as an advantageous embodiment that the first face be located at the end of a stud which is arranged on the support roller and which has a smaller diameter than the support roller on the covering face thereof which is supported in the shells.

Preferably, the orientation face which is arranged internally on the brake caliper is an inner face of the brake caliper which is processed so as to be planar and the surface normal of which coincides with the rotation axis of the support roller.

Preferably, the support roller is provided with a collar which extends radially beyond the covering face of the support roller which is supported in the shells, wherein the second face is located on the collar.

As a result of the confined spatial conditions inside the brake caliper, it may be advantageous for the collar to extend with the second face formed thereon only over a partial periphery of the covering face of the support roller, that is to say, over the partial periphery, on which the collar takes over the axial support action. In this case, a collar is either not present on the remaining periphery or is present only at a radially reduced height.

Furthermore, it is proposed with respect to the support roller that the covering face thereof have on the partial periphery, over which the collar extends, an asymmetry in relation to the roller axis. The asymmetry is preferably a recess on the covering face which is otherwise cylindrical.

For the mutual orientation of the components involved, it is further proposed that the second face abut against an orientation face which is arranged laterally on the brake application shaft. This orientation face may be in the form of an annular segment which is processed so as to be planar. If the axis of the annular segment further coincides with the roller axis, the relevant shell and the annular segment can be produced in a common milling or drilling process.

In principle, the support roller which preferably comprises steel can be a single support roller which extends over the length of the brake application shaft of the brake lever. However, an embodiment using two support rollers is preferable. According to this embodiment, the brake-caliper-side bearing is divided in two with a first and a second shell, in which one support roller is supported in each case, wherein the brake caliper is provided between the two shells with a housing opening. The housing opening at this location of the brake caliper has a number of advantages. Thus, it is possible to introduce through this housing opening a tool, with which the inner processing of the brake caliper is carried out during the production thereof. In the case of a disk brake which is assembled ready for operation, the housing opening can be used to reset again a re-adjustment device of the disk brake which is arranged therebehind, for example, after replacing and inserting new brake linings.

Preferably, the two support rollers are each provided at the ends thereof which face away from each other with an end face which abuts against a lateral orientation face which is arranged internally on the brake caliper.

The support rollers can be supported directly on the shells which are constructed at the rear side of the brake caliper. However, a construction type is preferred in this instance in which an additional bearing shell is arranged between the brake-caliper-side shells and the support rollers. This has the advantage that in the event of wear at this bearing location the brake caliper does not have to be replaced but instead replacing the additional bearing shells is sufficient.

In the construction type with two separate support rollers, the brake application shaft of the brake lever is also divided in two with a first longitudinal portion which is arranged on one side of the movement plane of the lever arm and a second longitudinal portion which is spaced apart from the first longitudinal portion and which is arranged at the other side of the movement plane of the lever arm. There is constructed at each of these two longitudinal portions a shell, in which a support roller is then directly supported, that is to say, without any additional bearing shell.

It is advantageous for the embodiment of the support roller if it is provided following the collar with a stud which has a smaller diameter than the covering face of the support roller. The collar extends only over a partial periphery of the covering face, whereas a collar is not present on the remaining periphery or is present only at a radially reduced height. In this case, the covering face has the asymmetry on the partial periphery over which the collar extends.

BRIEF DESCRIPTION OF THE DRAWINGS

Additional advantages and details will be appreciated from the following description and with reference to the appended drawings, in which.

DESCRIPTION OF PREFERRED EMBODIMENTS

Figure 1:
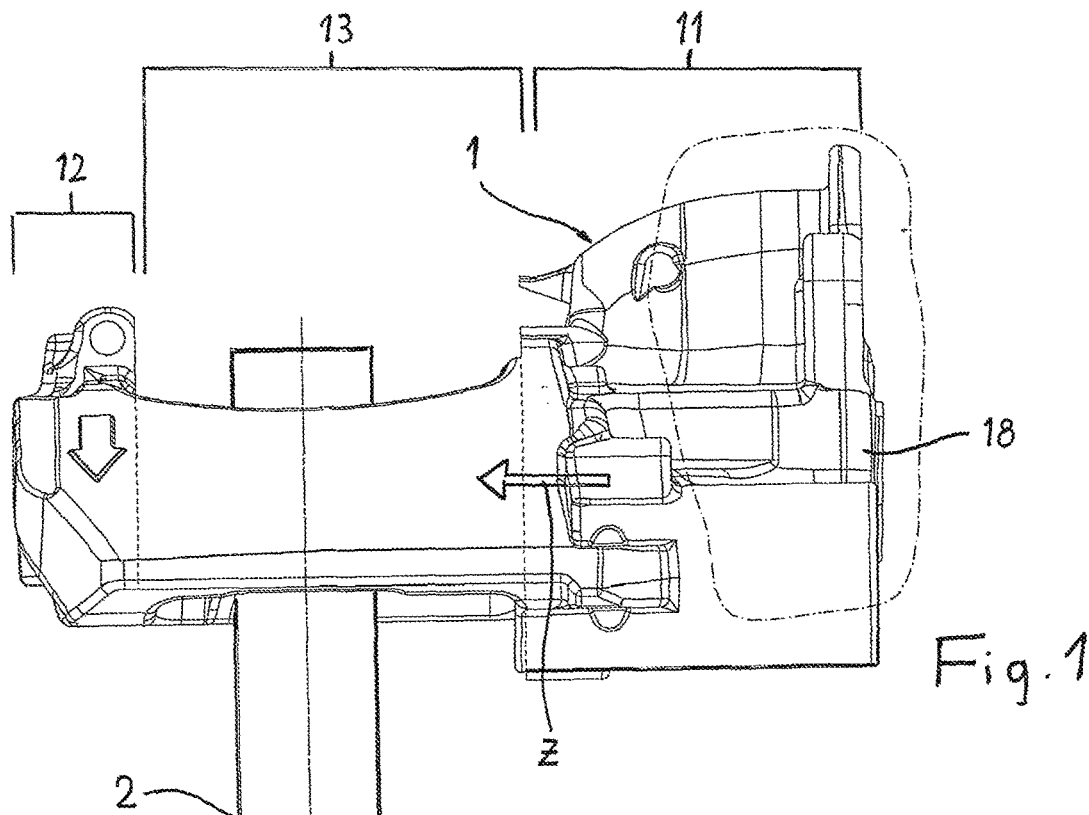
FIG. 1 is a side view of the brake caliper and the brake disk of a utility vehicle disk brake.
Figure 2:
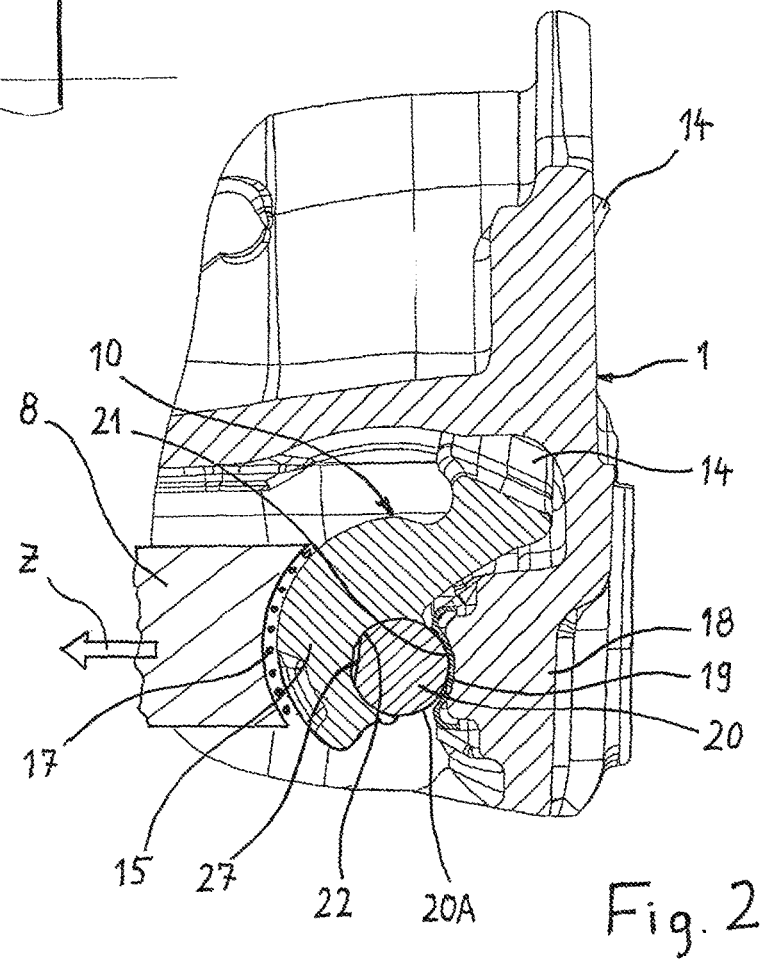
FIG. 2 is a longitudinal section through the portion of the brake caliper designated II in FIG. 1.

FIG. 1 and FIG. 2 illustrate a brake caliper 1 of a disk brake, wherein the disk brake is in this instance of the construction type of a utility vehicle brake which is actuated by compressed air of the sliding caliper or floating caliper type. The brake caliper 1 which is cast in a single piece is composed of three portions. A first caliper portion 11 which is located internally with respect to the vehicle when the brake is assembled is provided at the inner side thereof with a hollow space 7 which affords space for a brake application device. A second caliper portion 12 which is located externally with respect to the vehicle when the brake is assembled is arranged at the opposite side of the brake disk 2 of the disk brake. The two caliper portions 11, 12 are connected to each other by a bridge portion 13 which bridges the brake disk 2 and which provides in this instance a free space for at least a portion of the brake disk 2 and for the brake linings.

The brake caliper 1 is in one piece here in that the two caliper portions 11, 12 and the bridge portion 13 comprise a single portion. The first caliper portion 11 is open toward the free space of the bridge portion 13. This opening acts inter alia as an assembly opening and is so large that the brake application device can be assembled through it. After the brake assembly is complete, the opening is closed by a cover.

The two brake linings of the disk brake are not depicted in the drawings. A first brake lining is located in FIG. 1 to the right of the brake disk 2. This brake lining at the brake application side is directly actuated by the brake application device which is arranged in the hollow space 7 of the caliper portion 11 and is thus pressed against the brake disk 2. The second brake lining is arranged on the caliper portion 12 which is external with respect to the vehicle and takes up a fixed position at that location. It is the reaction-side brake lining.

The objective of the brake application device is to amplify the braking forces which are produced by a force member and to transmit them in the brake application direction Z which extends parallel with the rotation axis of the brake disk 2.

Component parts of the brake application device are inter alia two support rollers 20 which are rotatably supported against a caliper rear wall 18, a brake lever 10 which is arranged pivotably in the brake caliper housing and a pressure piece 8 which operates in the direction toward the brake lining at the vehicle interior, that is to say, at the brake application side.

The pressure piece 8 is in the form of a cross-member which extends transversely relative to the brake application direction Z. At the center of the cross-member 8, it is connected via a thread to a pressure piston which is supported against the brake-application-side brake lining and which can thus apply it against the brake disk 2.

The pivotable brake lever 10 has a fork-like shape and comprises a lever arm 14 and a brake application shaft 15 which is divided into two longitudinal portions. The brake application shaft 15 is supported, on the one hand, via the support rollers 20 with respect to the caliper rear wall 18 which closes the hollow space 7 in a manner facing away from the brake disk. A bearing shell 19 which can be replaced in the event of wear is arranged as a component part of this support between each of the two longitudinal portions of the brake application shaft 15 and a shell 21 which is formed securely on the caliper rear wall 18 at the inner side, respectively. The respective support roller 20 is supported in a rotationally movable manner on the bearing shell 19 which is configured as a part-cylindrical channel similarly to the shell 21. To this end, the support roller 20 is cylindrical over the majority of the periphery thereof with a radius which is equal to the inner radius of the bearing shell 19.

The brake application shaft 15 is pivotably supported via an additional pivot bearing 17 against the pressure piece 8 in the other direction, that is to say, in the brake application direction Z. To this end, the pressure piece 8 has a support region in the form of a half-shell. The additional pivot bearing 17 is constructed as a roller bearing in this instance.

In order to obtain a high brake application force, the brake application shaft 15 is supported eccentrically. This is because the pivot bearing which is supported against the brake caliper and which is defined by the axis A of the support rollers 20 is offset in terms of height in comparison with the pivot axis of the pivot bearing 17 which is arranged between the brake application shaft 15 and the pressure piece 8. If the eccentrically contoured brake application shaft 15 is rotated, therefore, a forward movement of the pressure piece 8 is brought about in the brake application direction Z, whereby the brake is applied and exerts braking force.

The lever arm 14 which is constructed in one piece thereon is used to rotate the brake application shaft 15. This lever arm 14 is provided near the free end thereof with a support location, against which the force member of the disk brake operates. In the case of disk brakes which are actuated by compressed air, this force member is a pneumatic brake cylinder which is supplied with compressed air by the compressed air system of the vehicle.

The brake lever 10 is generally fork-like because it branches into two legs starting from the lever arm 14 which is arranged on the pivoting center line. The first longitudinal portion of the brake application shaft 15 is located on the first leg and the second longitudinal portion of the brake application shaft 15 is located on the second leg. The brake lever 10 has a free space between these two longitudinal portions. This free space and furthermore the center of the pressure piece 8 provided with a threaded hole afford sufficient space for a re-adjustment device. This device is configured to compensate for the brake wear which occurs in the course of time and to correct the air gap of the brake. Components of the re-adjustment device are inter alia a drive element, an output element which reduces the air gap of the brake, a one-way coupling and an overload member. The output element of the re-adjustment device may be a spindle. This spindle is provided with an outer thread which is screwed into the threaded hole at the center of the pressure piece 8.

Most individual portions of the re-adjustment device are arranged in a re-adjustment axis. The re-adjustment axis is located in the brake application axis Z and extends at the same time perpendicularly to the plane in which the brake disk 2 extends.

Since the brake application shaft 15 is divided into two longitudinal portions, two spatially separated, channel-like shells 22 are formed on the brake lever 10 each for supporting one of the support rollers 20. Furthermore, there are also present two bearing shells 19.

One shell 22 with the support roller 20 thereof is located at one side and the other shell 22 with the support roller 20 thereof is located at the other side of the plane in which the lever arm 14 of the brake lever 10 carries out the pivot movement thereof.

An opening 25 is located in the caliper rear wall 18 between the other two shells 21, that is to say, the ones which are formed on the caliper rear wall 18, and preferably at the same time in the re-adjustment axis of the re-adjustment device. This opening 25 affords space, when the brake is mounted ready for operation, for a restoring element of a restoring device. This is because, if the brake linings of the disk brake are worn, they must be replaced. Subsequently, the re-adjustment device has to be reset to the initial position thereof, which is carried out by means of the mentioned restoring device. The restoring element of this restoring device is located in the opening 25 of the caliper rear wall 18 and is provided with wrench faces, against which a corresponding tool can be applied to reset the brake.

The two shells 21 of the caliper rear wall 18 are each configured as a partially cylindrical channel for the abutment of the bearing shells 19 which can be replaced in the event of wear. This simplifies the producibility of the shells 21, particularly if the shells 21 are aligned with each other.

Figure 3:
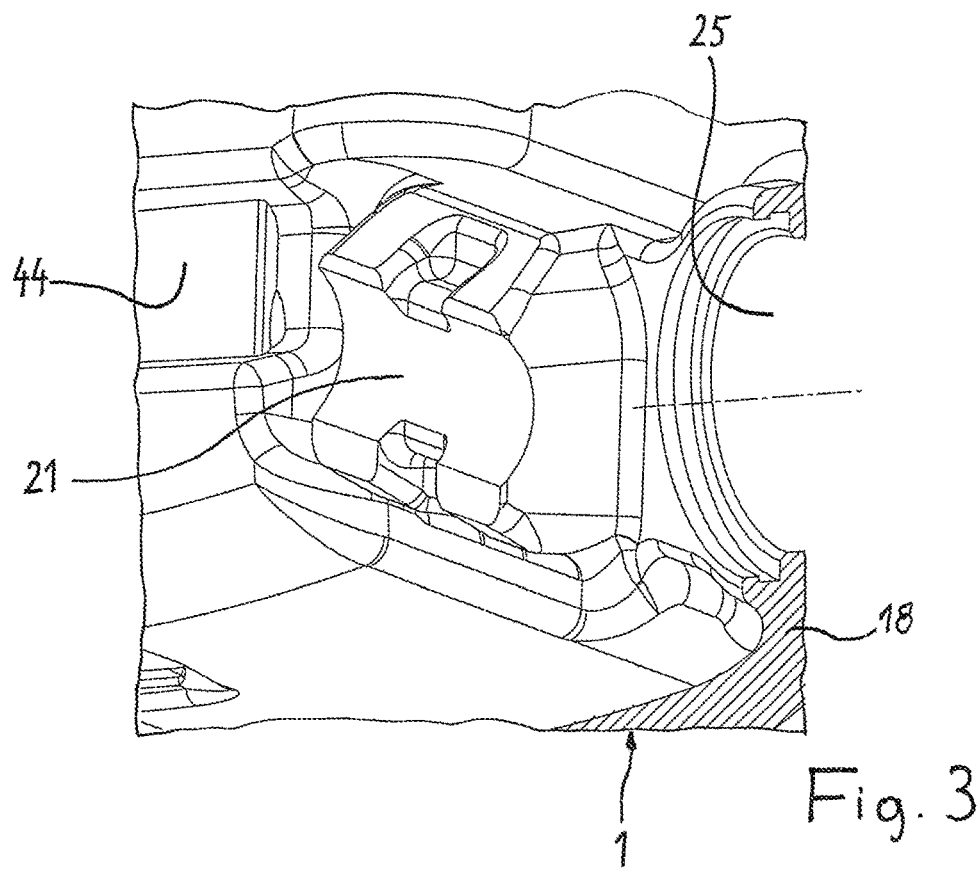
FIG. 3 is a perspective view of a support face internally on the caliper rear wall of the brake caliper.
Figure 4:
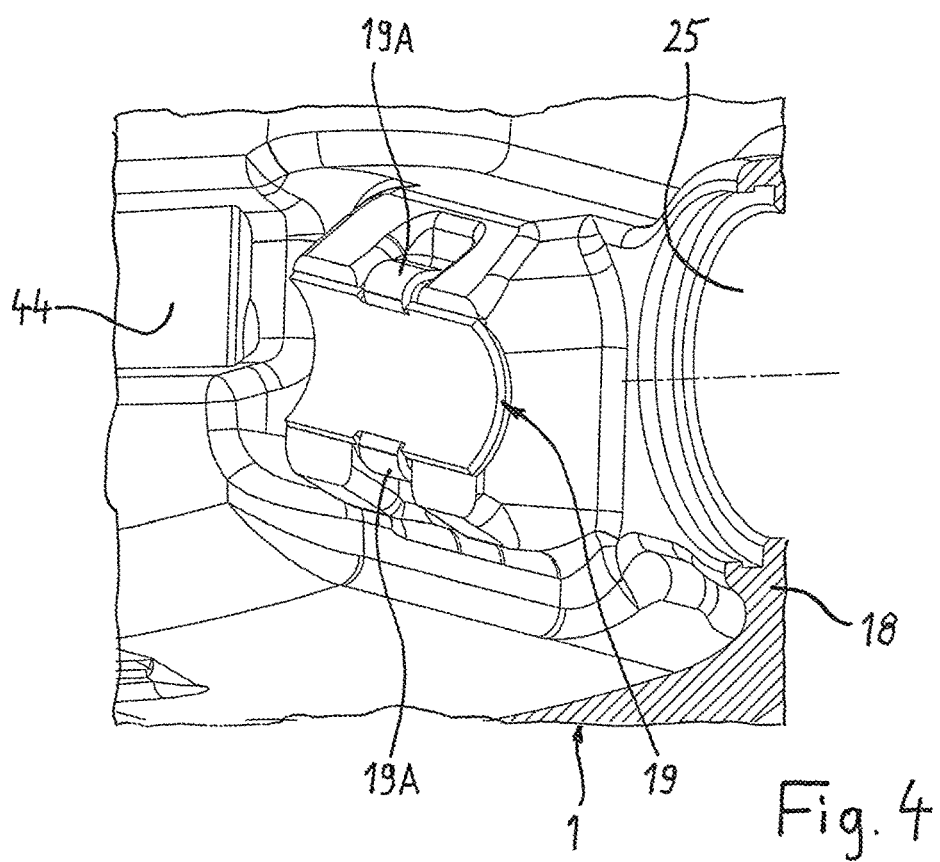
FIG. 4 shows the support face including a bearing shell which is placed at that location.
Figure 5:
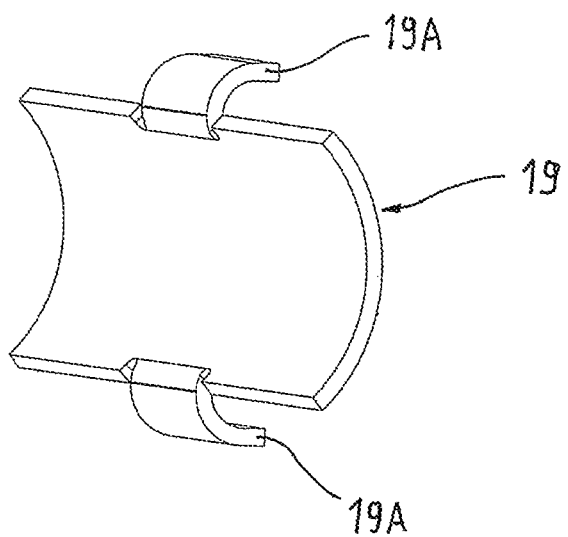
FIG. 5 is a perspective individual view of the channel-shaped bearing shell.
Figure 6:
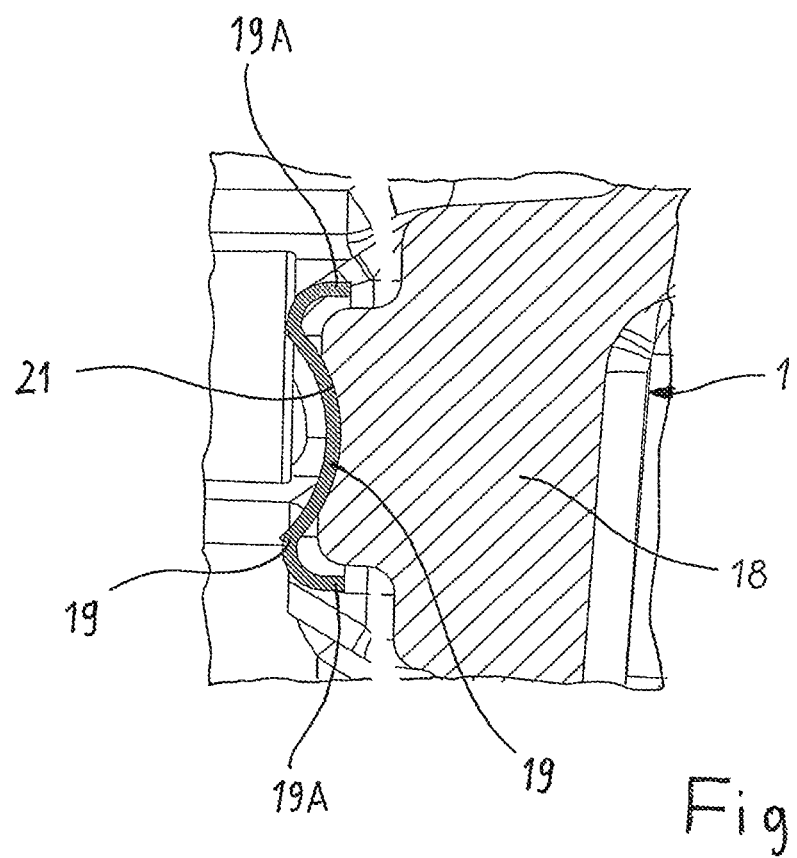
FIG. 6 is another longitudinal section through the caliper rear wall, the support face and the bearing shell which is placed thereon.

According to FIG. 4, for technical production reasons, each shell 21 is formed on a plate which is cast internally on the caliper rear wall 18. According to FIG. 3, each shell 21 is processed, wherein a processed, channel-like, H-shaped face is produced. This is because this face includes two wider support face portions and a narrower central portion which is arranged therebetween. The narrower central portion is caused by two incisions, with which the plate is provided as a result of the casting process. A wing-shaped lug 19A of the bearing shell 19 projects into each incision. The outer side of the bearing shell 19 extends further in a peripheral direction than the narrow central portion of the shell 21. In this manner, it is possible for the bearing shell 19 to move slightly on the shell 21 in a peripheral direction. However, this possible movement is limited in both peripheral directions.

Each bearing shell 19 preferably comprises an originally flat metal sheet which is produced by punching and shaping and which has a sliding bearing coating. The partially cylindrically curved outer side abuts the shell 21 in a planar manner. The support roller 20 abuts the partially cylindrical inner side of the bearing shell 19 with the cylindrical covering face 20A thereof so that the support roller 20 is supported in a freely rotatable manner about the roller axis A thereof in the bearing shell 19.

Figure 9A:
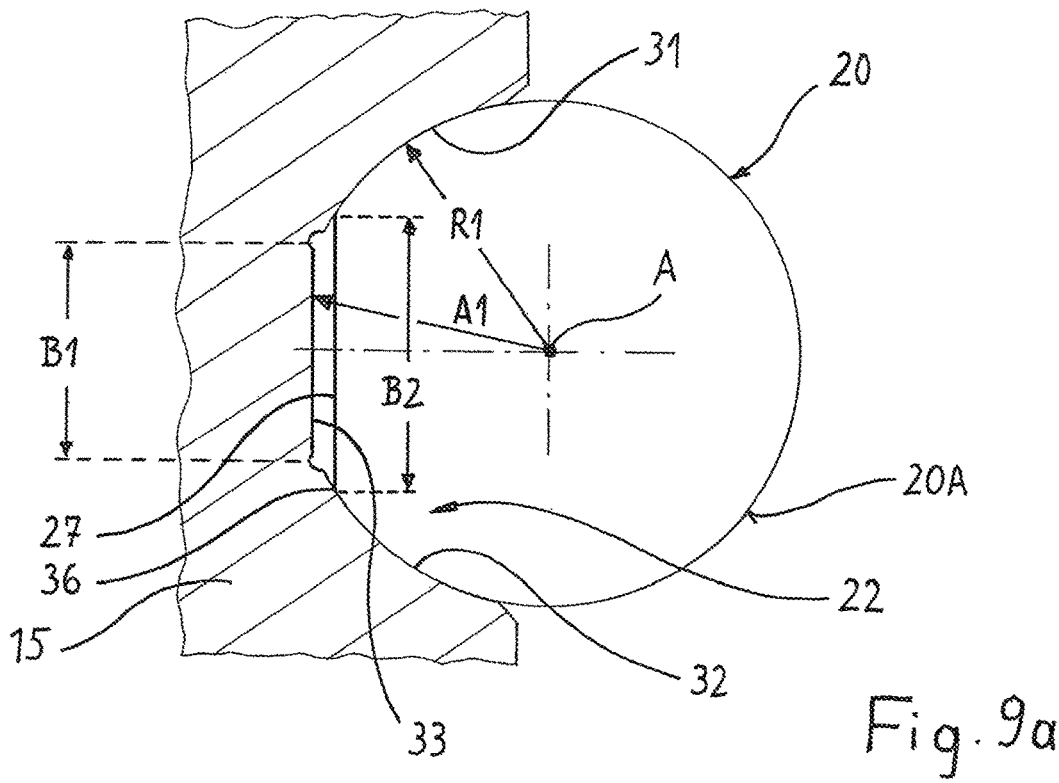
FIG. 9*a* is a cross-section through the support roller in the region of the abutment of the support roller against the brake lever.

However, as explained below with reference to FIGS. 9a, 9b, the support roller 20 cannot be freely rotated with respect to the other shell thereof, that is to say, with respect to the shell 22 which is constructed directly on the brake application shaft 15. Instead, a rotational movability is either not present in this case or it is at least powerfully reduced by the support roller 20 being constructed in a rotationally secure manner or rotationally movably to a limited extent in relation to the shell 22. This is achieved by asymmetry in relation to the roller axis A. This asymmetry involves the otherwise cylindrical covering face 20A having a flattened portion 27 which extends parallel with the roller axis A. This flattened portion 27 extends over the same axial length as the covering face 20A. The flattened portion 27 extends in a peripheral direction over an angle which is less than 80°, whereas the remaining periphery is cylindrical.

The face of the shell 22, against which the support roller directly abuts, is also not exactly partially cylindrical and therefore also asymmetrical in relation to the axis A. Instead, the shell 22 is composed in a peripheral direction from two segments 31, 32, which are bent in a pitch-circle-like manner or partially cylindrical manner and which have the same radius R1 and the same reference point of these radii, and a flattened portion 33 which is arranged on the base of the shell 22 between the segments 31, 32. The flattened portion 33 leads to the asymmetry and extends parallel with the roller axis A. The flattened portion 33 projects in comparison with the extent of the segments 31, 32 radially inwardly by the radially measured spacing A1 between the roller axis A and the flattened portion 33 being smaller at least in regions than the radius R1 of the shell segments 31, 32.

In order to tightly limit the rotatability of the support roller 20 with respect to the shell 22, the width B1 of the flattened portion 33 in the shell 22 is smaller and preferably from 10% to 30% smaller than the width B2 of the flattened portion 27 which is opposite the flattened portion 33 with a small radial spacing on the support roller 20.

Figure 9B:
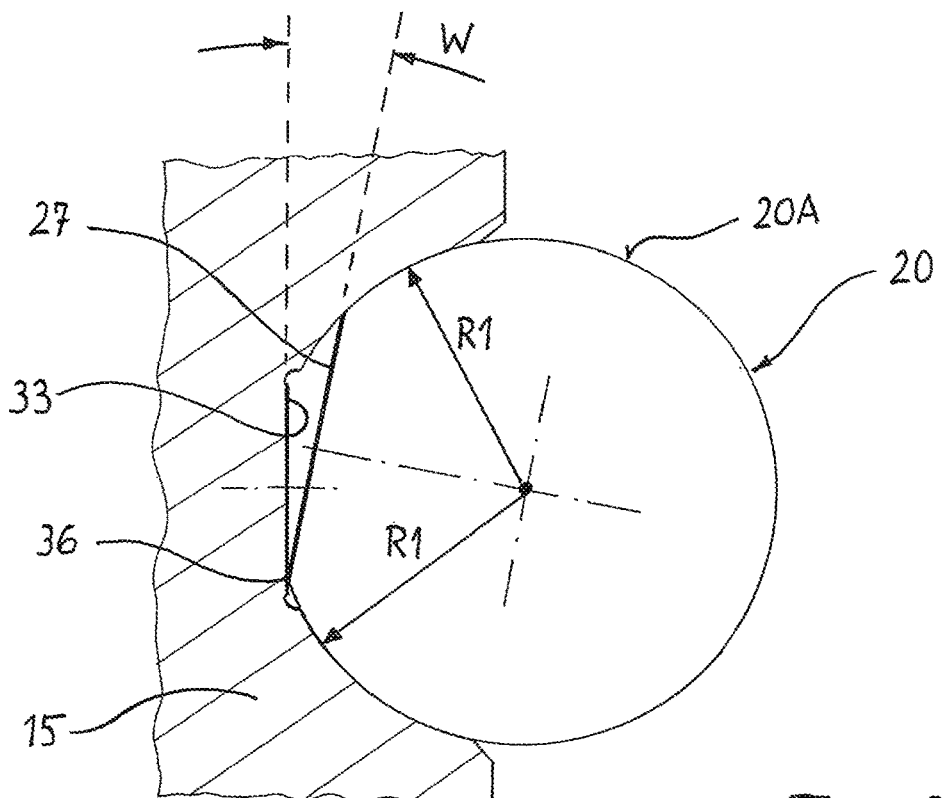
FIG. 9*b* shows the objects according to FIG. 9*a* in a changed rotational position of the support roller.

FIG. 9b represents the situation in which the edge 36 which is present at the transition between the cylindrical covering face 20A and the flattened portion 27 abuts against the flattened portion 33 on the base of the shell 22. After reaching this rotational position, no more additional rotation relative to the shell 22 is possible for the support roller 20. As a result of the flattened portions 27, 33, the maximum possible rotation angle in both rotation directions is 6°.

The radius R1 of the shell segments 31, 32 is slightly greater and in any case no smaller than the radius of the cylindrical portion of the covering face 20A. The support roller 20 can therefore have slight radial play in the shell 22 in order to prevent production precision which is excessively high and therefore expensive during the surface treatment of the components. As a result of the presence of the mutually opposite recesses 27, 33, a good abutment of the support roller 20 in the shell 22 is still achieved.

The support roller 20 is ground so that the channels on the cylindrical covering face 20A of the support roller extend in a peripheral direction. It may be advantageous for a small amount of wear on the surfaces if the segments 31, 32 are strengthened with a grinding, milling or drilling tool which rotates about the axis A, wherein the channels which are produced in this case extend in a peripheral direction.

Figure 7:
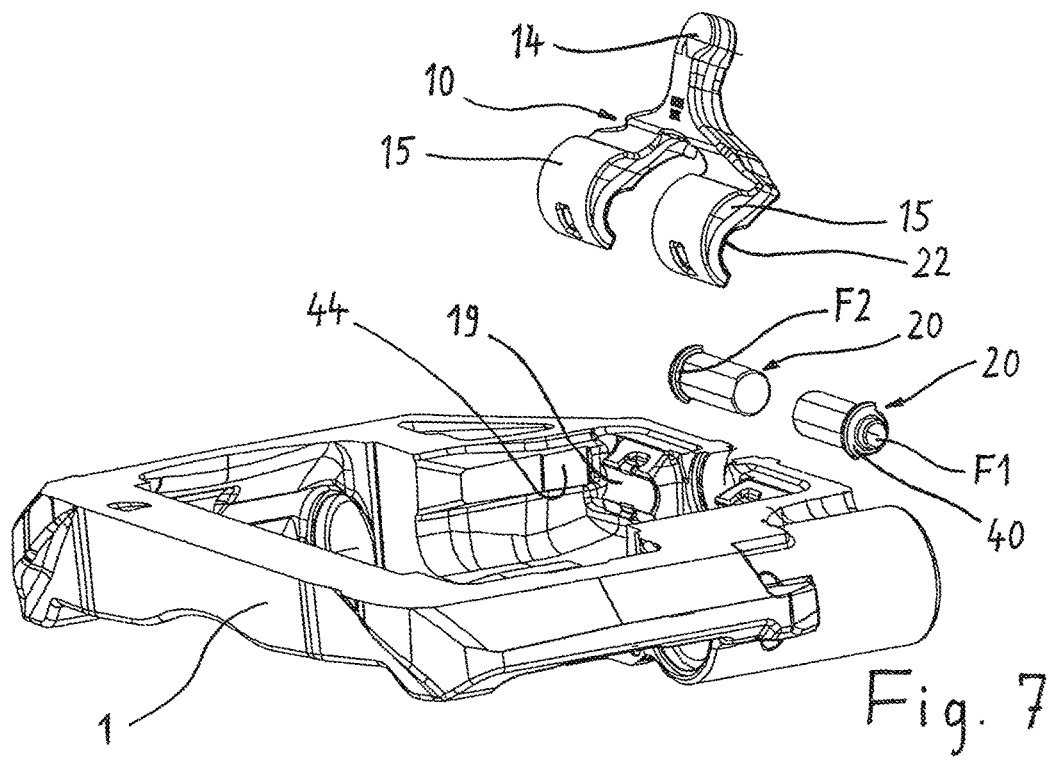
FIG. 7 is an exploded view of the brake caliper, two support rollers and a brake lever of the disk brake.
Figure 8:
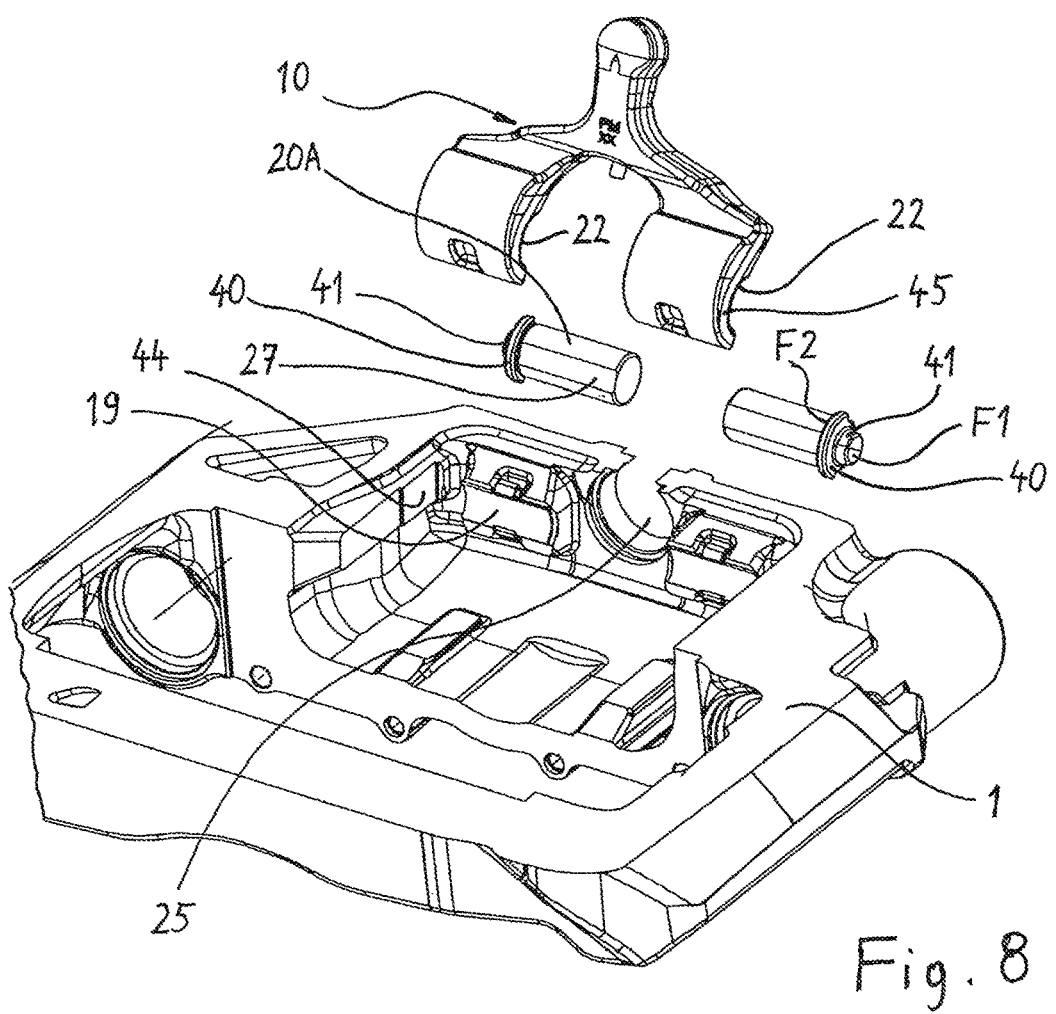
FIG. 8 shows the objects according to FIG. 7 from a slightly offset perspective.

The two support rollers 20 and the brake lever 10 are depicted in FIGS. 7 and 8, still before the definitive assembly. Each support roller 20 has three portions in the longitudinal direction thereof, that is to say, firstly the actual support portion with the covering face 20A, secondly a collar 40 which abuts it and thirdly a stud portion 41 which abuts the collar 40 and which forms the end of the support roller 20. The collar 40 and the end of the support roller 20 are configured in such a manner that the support roller 20 abuts the brake caliper 1 in an axial direction A with a first face F1 and abuts the brake lever 10 with a second face F2.

The second face F2 is orientated counter to the first face F1. Furthermore, the second face F2 is arranged to be offset in an axial direction A relative to the first face F1. The first face F1 is the free end face of the stud 41. This stud 41 is of flat form and it is located opposite an orientation face 44 which is constructed directly on the brake caliper 1 with slight play at most. The two orientation faces 44 are mutually facing side faces internally on the brake caliper 1, the surface normals of which coincide with the axis A of the support rollers. Both orientation faces 44 are processed in a planar manner, for example, by grinding or milling.

As a result of the limited space inside the brake caliper, the stud 41 has a smaller diameter than the support roller 20 on the covering face 20A which is supported in the shells 21, 22.

The collar 40 which is arranged between the covering face 20A and the stud 41 extends radially beyond the cylindrical covering face 20A of the support roller. In this manner, a side of the collar 40 forms the second orientation face F2. This face F2 is opposite an orientation face 45 which is constructed directly on the brake lever 10 in the longitudinal roller direction with at most a small amount of play. The faces F2 of the two support rollers 20 face each other.

One of the orientation faces 45 is located at each side of the brake application shaft 15. Each orientation face 45 is in the form of an annular segment which can be processed in a flat or planar manner. The reference axis of the annular segment coincides with the roller axis A of the support roller, which is favorable during the production of the shell 22.

The two support rollers 20 are therefore not only support means during the transmission of the brake application forces but instead they are also lateral orientation means, that is to say, orientation means transversely relative to the brake application direction Z. This is because each support roller 20 is located with the face F1 against the orientation face 44 of the brake caliper 1 so that the support roller 20 is centered or laterally orientated with respect to the brake caliper. At the same time, the second face F2 which is arranged on the radially widened collar 40 of each support roller abuts against the orientation face 45 at the respective side of the brake lever 10. Overall, therefore, the lateral orientation or centering of the brake lever 10 relative to the housing of the brake caliper 1 is achieved. In this case, the first support roller 20 takes over the orientation of the brake lever 10 in one transverse direction and the second support roller 20 takes over the orientation of the brake lever 10 in the other, that is, opposite transverse direction.

Therefore, no additional elements or components are necessary in order to center the brake lever 10 transversely relative to the brake application direction Z in the brake caliper 1. At the same time, the collar 40 prevents the respective support roller 20 from moving in the direction toward the centrally located free space which is located between the two longitudinal portions of the brake application shaft 15. This is because components of the brake application device and/or the re-adjustment device, with which a collision must not occur, are located in this free space.

The face F2 does not abut against the brake lever 10 over the entire periphery but instead only over a peripheral segment. Therefore, it is also unnecessary for the collar to extend over the entire periphery. Instead, the collar 40 extends, as can be seen in FIGS. 7 and 8, only over a partial periphery of the support roller 20, whereas a collar is not present or is present only at a radially reduced height on the remaining periphery.

The support rollers 20 have on the partial periphery on which the collar 40 with the face F2 is located the described asymmetry, that is to say, the recess or flattened portion 27. This fixes the specific rotational position of the support roller 20 in the shell 22 and has structural advantages. This is because, in the two corresponding corner regions of the brake caliper 1, there is very little space, as can be seen, for example, in FIGS. 3 and 4. A collar 40 which surrounds the entire periphery of the support rollers 20 would run the risk of colliding with faces or steps internally on the brake caliper 1.

LIST OF REFERENCE CHARACTERS

1 Brake caliper
2 Brake disk
7 Hollow space
8 Pressure piece
10 Brake lever
11 Caliper portion
12 Caliper portion
13 Bridge portion
14 Lever arm
15 Brake application shaft
17 Pivot bearing
18 Caliper rear wall
19 Bearing shell
19A Lug
20 Support roller
20A Covering face
21 Shell
22 Shell
25 Opening
27 Recess, flattened portion
31 Segment
32 Segment
33 Flattened portion
36 Edge
40 Collar
41 Stud
44 Orientation face
45 Orientation face
A Axis, roller axis
A1 Spacing
B1 Width
B2 Width
F1 First face
F2 Second face
R1 Radius
W Rotation angle
Z Brake application direction

What is claimed is:

1. A disk brake comprising:
   a brake caliper (1);
   a brake application device arranged in the brake caliper (1) and configured to act with force on brake linings of the disk brake;
   the brake application device comprising a brake lever (10) configured to be actuated by a force member;
   the brake lever (10) comprised of a lever arm (14), against which the force member is supported, and a brake application shaft (15) supported with a first end against a pressure piece (8), which operates in a direction toward the brake linings, and with a second end against the brake caliper (1) at an inner side thereof, wherein the brake caliper (1) and the brake application shaft (15) have sides facing each other that are configured as shells (21, 22);
   a support roller (20) supported in the shells (21, 22) and having a roller axis (A) extending transversely relative to a brake application direction (Z), wherein the support roller (20) comprises a covering face (20A) that is supported directly in one of the shells (21, 22);
   wherein the support roller (20) comprises an asymmetry relative to the roller axis (A) to provide a rotationally secured position or a rotation to a limited extent in relation to said one of the shells (21, 22);
   wherein the covering face (20A) has a cylindrical surface and comprises a recess (27) in the cylindrical surface constituting the asymmetry of the support roller (20), wherein the recess (27) extends parallel to the roller axis (A) and wherein the recess (27) is a flattened portion;
   wherein said one of the shells (22) comprises two segments (31, 32) curved as a pitch-circle and having the same radius (R1) and further comprises a flattened portion (33) arranged between the two segments, wherein the flattened portion (33) extends parallel to the roller axis (A) and extends radially inwardly relative to the radius (R1) of the two segments (31, 32);

wherein a width (B1) of the flattened portion (33) of said one of the shells (22) is smaller than a width (B2) of the recess (27).

2. The disk brake as claimed in claim 1, wherein said one of the shells (22) in which the covering face (20A) is directly supported is provided on the brake application shaft (15).

3. The disk brake as claimed in claim 1, wherein the recess (27) extends over the same length as the covering face (20A).

4. The disk brake as claimed in claim 1, wherein the flattened portion (33) of said one of the shells (22) is a channel.

5. The disk brake as claimed in claim 1, wherein the width (B1) of the flattened portion (33) of said one of the shells (22) is smaller than the width (B2) of the recess (27) by 10% to 30%.

6. The disk brake as claimed in claim 1, wherein a radius of the support roller (20) is smaller than or maximally equal to the radius (R1) of the two segments (32, 32).

7. A disk brake comprising:
a brake caliper (1);
a brake application device arranged in the brake caliper (1) and configured to act with force on brake linings of the disk brake;
the brake application device comprising a brake lever (10) configured to be actuated by a force member;
the brake lever (10) comprised of a lever arm (14), against which the force member is supported, and a brake application shaft (15) supported with a first end against a pressure piece (8), which operates in a direction toward the brake linings, and with a second end against the brake caliper (1) at an inner side thereof, wherein the brake caliper (1) and the brake application shaft (15) have sides facing each other that are configured as shells (21, 22);
a support roller (20) having a roller axis (A) defining an axial direction of the support roller (20) and extending transversely relative to a brake application direction (Z), wherein the support roller (20) is supported in the shells (21, 22);
wherein the support roller (20) comprises a first face (F1) and a second face (F2) oriented opposite to the first face (F1), wherein the first face (F1) abuts axially against the brake caliper (1) and the second face (F2) abuts axially against the brake application shaft (15) of the brake lever (10) for aligning the support roller (20) in the axial direction;
wherein the first face (F1) is an end face of the support roller (20) and abuts against a first orientation face (44) arranged internally on the brake caliper (1);
wherein the first face (F1) is arranged at an end of a stud (41) which is arranged on the support roller (20) and which has a diameter that is smaller than a diameter of the support roller (20) measured at a covering face (20A) of the support roller (20) supported in the shells (21, 22).

8. The disk brake as claimed in claim 7, wherein the second face (F2) is offset in the axial direction relative to the first face (F1).

9. The disk brake as claimed in claim 7, wherein the first orientation face (44) is an inner face of the brake caliper (1) which is planar and has a surface normal coinciding with the roller axis (A).

10. The disk brake as claimed in claim 7, wherein the support roller (20) comprises a covering face (20A) supported in the shells (21, 22), wherein the support roller (20) further comprises a collar (40) which extends radially beyond the covering face (20A) with a radial height, wherein the second face (F2) is arranged on the collar (40).

11. The disk brake as claimed in claim 10, wherein the collar (40) extends only over a portion of a periphery of the covering face (20A), wherein a remaining portion of the periphery of the covering face (20A) has no collar.

12. The disk brake as claimed in claim 10, wherein the collar (40) extends over a portion of a periphery of the covering face (20A) with a reduced height relative to the radial height.

13. The disk brake as claimed in claim 10, wherein the collar (40) extends only over a partial periphery of the covering face (20A), wherein the covering face (20A) of the support roller (20) comprises an asymmetry relative to the roller axis (A) in a region of the partial periphery.

14. The disk brake as claimed in claim 13, wherein the asymmetry is a recess in a cylindrical surface of the covering face.

15. The disk brake as claimed in claim 7, wherein the second face (F2) abuts against a second orientation face (45) arranged laterally on the brake application shaft (15).

16. The disk brake as claimed in claim 15, wherein the second orientation face (45) is a planar annular segment, wherein an axis of the annular segment coincides with the roller axis (A).

17. A disk brake comprising:
a brake caliper (1);
a brake application device arranged in the brake caliper (1) and configured to act with force on brake linings of the disk brake;
the brake application device comprising a brake lever (10) configured to be actuated by a force member;
the brake lever (10) comprised of a lever arm (14), against which the force member is supported, and a brake application shaft (15) supported with a first end against a pressure piece (8), which operates in a direction toward the brake linings, and with a second end against the brake caliper (1) at an inner side thereof, wherein the brake caliper (1) and the brake application shaft (15) have sides facing each other that are configured as shells (21, 22);
a support roller (20) having a roller axis (A) defining an axial direction of the support roller (20) and extending transversely relative to a brake application direction (Z), wherein the support roller (20) is supported in the shells (21, 22);
wherein the support roller (20) comprises a first face (F1) and a second face (F2) oriented opposite to the first face (F1), wherein the first face (F1) abuts axially against the brake caliper (1) and the second face (F2) abuts axially against the brake application shaft (15) of the brake lever (10) for aligning the support roller (20) in the axial direction;
wherein the first face (F1) is an end face of the support roller (20) and abuts against a first orientation face (44) arranged internally on the brake caliper (1);
wherein the shell of the brake caliper supporting the support roller (20) is divided into a first shell part and a second shell part, wherein the support roller (20) is divided into a first support roller part supported in the first shell part and a second support roller part supported in the second shell part, wherein the brake caliper is provided with a housing opening (25) arranged between the first and second shell parts, wherein the housing opening (25) extends in the brake application direction (Z).

18. The disk brake as claimed in claim 17, wherein the first and second support roller parts comprise ends facing away from each other, wherein said ends are each provided with the first and second faces (F1, F2).

19. The disk brake as claimed in claim 17, further comprising bearing shells (19) arranged between the first and second shell parts and the first and second support roller parts (20), respectively.

20. The disk brake as claimed in claim 7, wherein the brake application shaft (15) is divided into a first longitudinal portion and a second longitudinal portion spaced apart from the first longitudinal portion, wherein the first and second longitudinal portions are arranged opposite each other relative to a movement plane of the lever arm (14), and wherein the first and second longitudinal portions each comprise a shell part of the shell of the brake application shaft (15) supporting directly the support roller (20).

* * * * *